(12) United States Patent
Orritt et al.

(10) Patent No.: US 10,541,503 B2
(45) Date of Patent: Jan. 21, 2020

(54) CLAMP RING

(75) Inventors: Chris Orritt, Wigan (GB); Richard Joshi, Wigan (GB)

(73) Assignee: ATG R&D, Wigan (GB)

( * ) Notice: Subject to any disclaimer, the term of this patent is extended or adjusted under 35 U.S.C. 154(b) by 351 days.

(21) Appl. No.: 13/464,937

(22) Filed: May 4, 2012

(65) Prior Publication Data

US 2013/0136530 A1 May 30, 2013

Related U.S. Application Data

(60) Provisional application No. 61/504,142, filed on Jul. 1, 2011.

(51) Int. Cl.

| *F16B 2/14* | (2006.01) |
|---|---|
| *F21V 23/06* | (2006.01) |
| *F21V 25/02* | (2006.01) |
| *H01R 13/622* | (2006.01) |
| *H01R 13/639* | (2006.01) |
| *H01R 33/97* | (2006.01) |

(52) U.S. Cl.
CPC .............. *H01R 33/97* (2013.01); *F16B 2/14* (2013.01); *F21V 23/06* (2013.01); *H01R 13/622* (2013.01); *H01R 13/639* (2013.01); *F16B 2200/506* (2018.08); *F21V 25/02* (2013.01); *Y10T 403/52* (2015.01)

(58) Field of Classification Search
CPC ........................ C02F 1/32; C02F 1/325; C02F 2201/32–328; F16B 2/00; F16B 2/14; F16B 7/02; F16B 7/025; F16B 2200/506; F16D 1/033; F16D 1/076; F16D 1/0805; F16D 1/09; F16D 1/092; F16D 1/095; F16D 1/096; F21V 25/02; F21V 23/06; H01R 13/622; H01R 13/639; H01R 33/97; Y10T 403/52; Y10T 403/645; Y10T 403/7051; Y10T 403/7052; Y10T 403/7056; Y10T 403/7061

USPC ............... 403/337, 367, 368, 370, 372, 288; 277/403

See application file for complete search history.

(56) References Cited

U.S. PATENT DOCUMENTS

| 4,455,040 | A | * | 6/1984 | Shinn ....................... E21B 33/04 277/322 |
|---|---|---|---|---|
| 5,115,166 | A | * | 5/1992 | Campbell et al. ........ 250/455.11 |
| 5,413,760 | A | * | 5/1995 | Campbell et al. ........ 250/455.11 |
| 5,707,252 | A | * | 1/1998 | Meszaros ....................... 439/320 |
| 6,715,899 | B1 | * | 4/2004 | Wu ................................. 362/655 |
| 7,721,827 | B2 | * | 5/2010 | Gallifet .................... E21B 10/25 175/331 |

(Continued)

OTHER PUBLICATIONS

"Definition of bulbous." Google. [online], [retrieved on Nov. 13, 2014]. Retrieved from the Internet <URL: https://www.google.com/search?q=define%3A+bulbous&sourceid=ie7&rls=com.microsoft:en-us:IE-Address&ie=&oe=&gws_rd=ssl>.*

(Continued)

*Primary Examiner* — Josh Skroupa

(57) ABSTRACT

An improved clamp ring system comprises a clamp ring having a wedge shaped seal face; a reactor having a clamp ring mounting recess; a quartz sleeve disposed within the clamp ring mounting recess; a seal being disposed within the clamp ring mounting recess around the quartz sleeve. The clamp ring is removably attached to the reactor near the clamp ring mounting recess such that the wedge shaped seal face compresses the seal against the quartz sleeve.

11 Claims, 6 Drawing Sheets

(56) References Cited

U.S. PATENT DOCUMENTS

| | | | |
|---|---|---|---|
| 8,889,075 B2* | 11/2014 | Tanaka et al. | 422/128 |
| 8,944,840 B2* | 2/2015 | Orritt et al. | 439/359 |
| 2007/0241288 A1 | 10/2007 | Wang | |
| 2008/0315117 A1* | 12/2008 | Kauling | B01J 19/123 |
| | | | 250/455.11 |

OTHER PUBLICATIONS

"Definition of wedge." Google. [online], [retrieved on Nov. 13, 2014]. Retrieved from the Internet <URL: https://www.google.com/search?q=define%3A+wedge&sourceid=ie7&rls=com.microsoft:en-us:IE-Address&ie=&oe=&gws_rd=ssl>.*

"Definition of flange." Google. [online], [retrieved on Jun. 18, 2015]. Retrieved from the Internet <URL: https://www.google.com/search?q=define%3A+flange&sourceid=ie7&rls=com.microsoft:en-US:IE-Address&ie=&oe=&gws_rd=ssl>.*

The European Search Report and related documents are attached hereto.

* cited by examiner

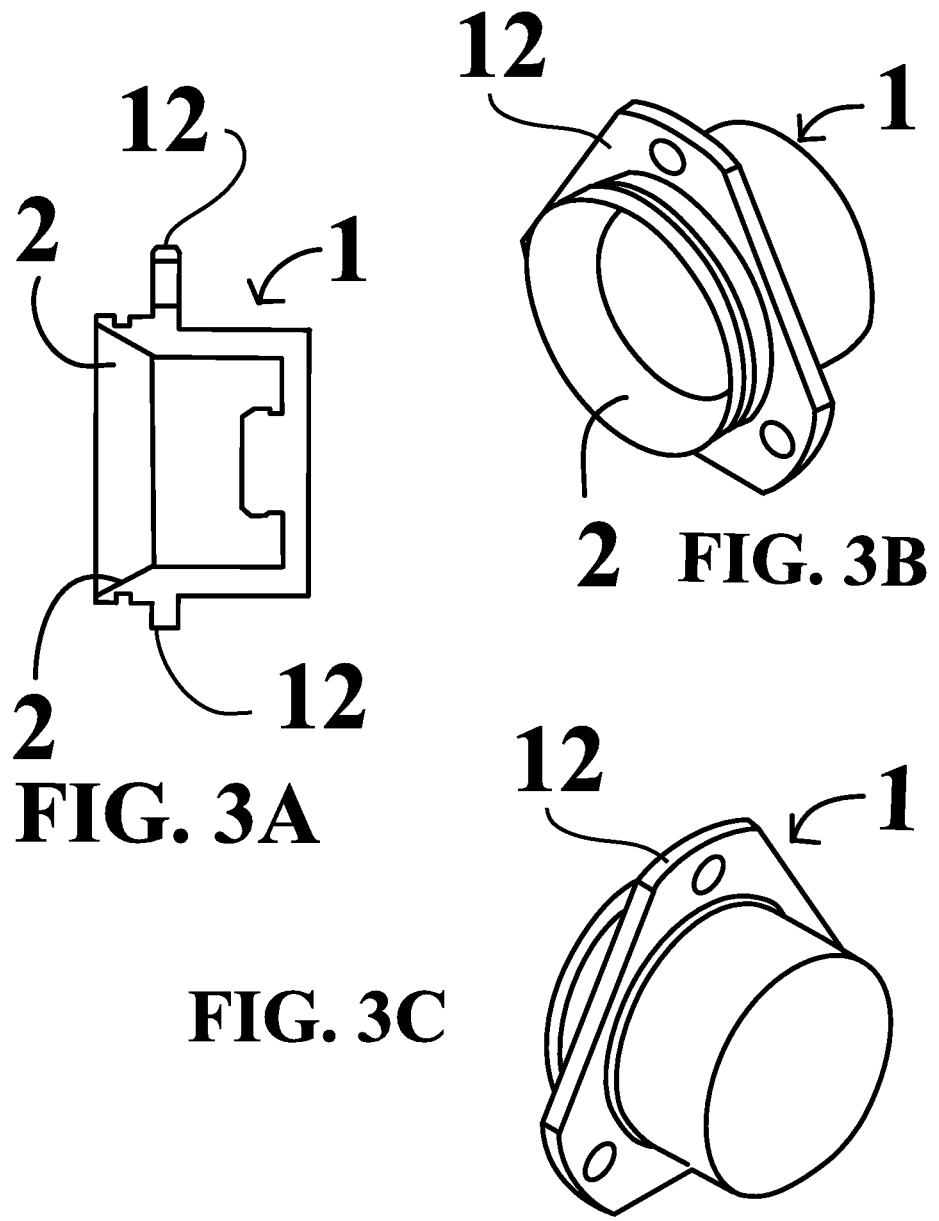

CLAMP RING

CROSS REFERENCE TO RELATED APPLICATIONS

61/504,142, filed on Jul. 1, 2011, of Richard Joshi, et al. for "Improved Lamp Connector".

FEDERALLY SPONSORED RESEARCH

Not Applicable

SEQUENCE LISTING, TABLE, OR COMPUTER PROGRAM COMPACT DISK APPENDIX

Not Applicable

CLAIM OF PRIORITY BASED ON COPENDING APPLICATION

Claims priority to 61/504,142, filed on Jul. 1, 2011, of Richard Joshi, et al. for "Improved Lamp Connector".

The present application is related to the provisional patent application No. 61/504,142, filed on Jul. 1, 2011, of Richard Joshi, et al. for "Improved Lamp Connector", and based on which priority is herewith claimed under 35 U.S.C. 119(e) and the disclosure of which is incorporated herein by reference in its entirety as if fully rewritten herein.

BACKGROUND AND SUMMARY

The present invention relates generally to UV water treatment systems and specifically to such systems that use UV lamps disposed within quartz sleeves, the assemblies being mounted in reactors.

In one embodiment, the present invention comprises clamp ring 1, wedge shaped seal face 2, flange 12, flange mounting holes 11, seal 3, quartz sleeve 4, clamp ring mounting recess 5, reactor 6, lamp 9, and reactor cavity 10.

One novel aspect of the present invention it is the wedge shaped seal face which ensures the seal is spread across the quartz sleeve and that the seal is only deformed not crushed, thus reducing the stress on the quartz sleeve (aka quartz glass). Using a bulbous, or exaggerated, seal (aka o-ring) allows a greater degree of deformity in the seal as it is compressed by the clamp ring. The shape of the wedge also gives the advantage that as the internal pressure within the reactor increases, the seal actually tightens further onto the quartz.

Other benefits, objects, and advantages are: improved vibration resistance (the larger seal face and better clearances allow the quartz to better cope with high vibration environments), improved maintenance (easy installation—the clamp ring can be bottomed out without any risk of over compressing the seal), the wedge shape allows a larger clearance hole (in clamp ring mounting recess 5) which tolerates possible misalignment of the clamp ring (aka flange), easy extraction (the larger seal, and clearances around it, allow for easier seal removal), design of the seal face ensures optimum sealing with minimal stress on the quartz (as the internal pressure increases, the seal automatically tightens onto the quartz ensuring best possible balance between sealing and pressure on the quartz), and the invention provides a guaranteed seal in case of quartz failure (in the event of a quartz failure, the seal ensures a watertight seal).

BRIEF DESCRIPTION OF THE DRAWINGS

FIG. 3A depicts a side cutaway view of the wedge shaped seal face disposed in rear clamp ring.

FIG. 3B depicts a perspective view of the wedge shaped seal face disposed in rear clamp ring.

FIG. 3C depicts a perspective view of the wedge shaped seal face disposed in rear clamp ring.

DETAILED DESCRIPTION

Figure 5B:
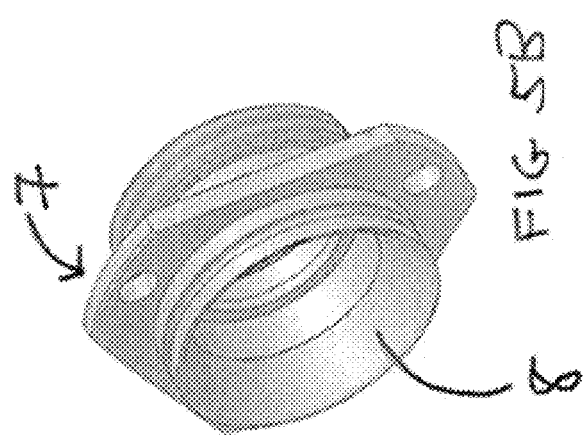
FIG. 5B depicts a perspective view of the wedge shaped seal face disposed in screwed clamp ring.
Figure 5C:
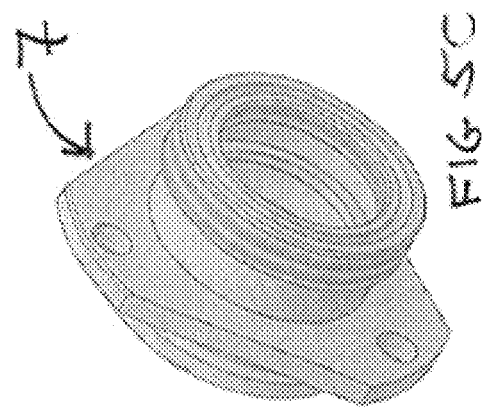
FIG. 5C depicts a perspective view of the wedge shaped seal face disposed in screwed clamp ring.
Figure 5A:
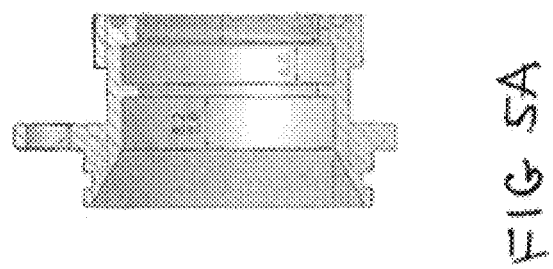
FIG. 5A depicts a side cutaway view of the wedge shaped seal face disposed in screwed clamp ring.
Figure 5D:
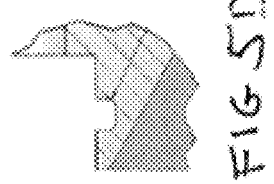
FIG. 5D depicts a side cutaway view of the wedge-shaped seal face of the clamp ring of FIG. 5A.
Figure 5E:
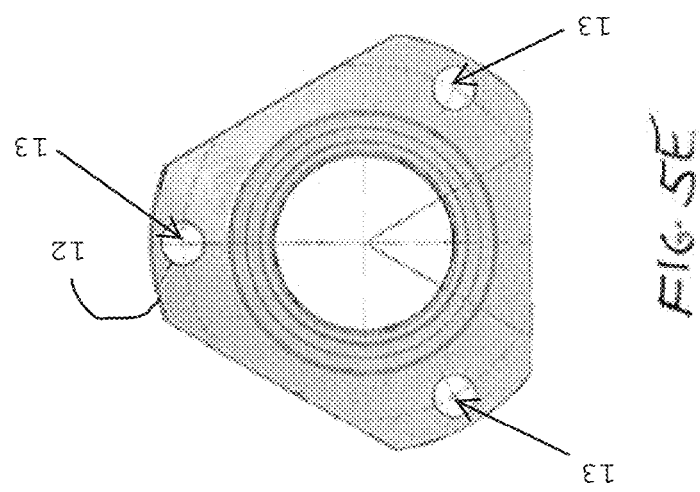
FIG. 5E depicts an end view of the clamp ring of FIG. 5A.

One embodiment of an improved clamp ring comprises clamp ring 1 having wedge shaped seal face 2. As depicted, clamp ring 1 (aka "rear clamp ring"), and screw clamp ring 7 each have a wedge shaped seal face (2 & 8 respectively) having essentially the same functionality in the various embodiments discussed regardless of use in screwed clamp ring or rear clamp ring. In one embodiment (FIGS. 3A, 5A) wedge shaped seal face 2, 8 is disposed at an angle of 28.4 degrees.

Figure 1:
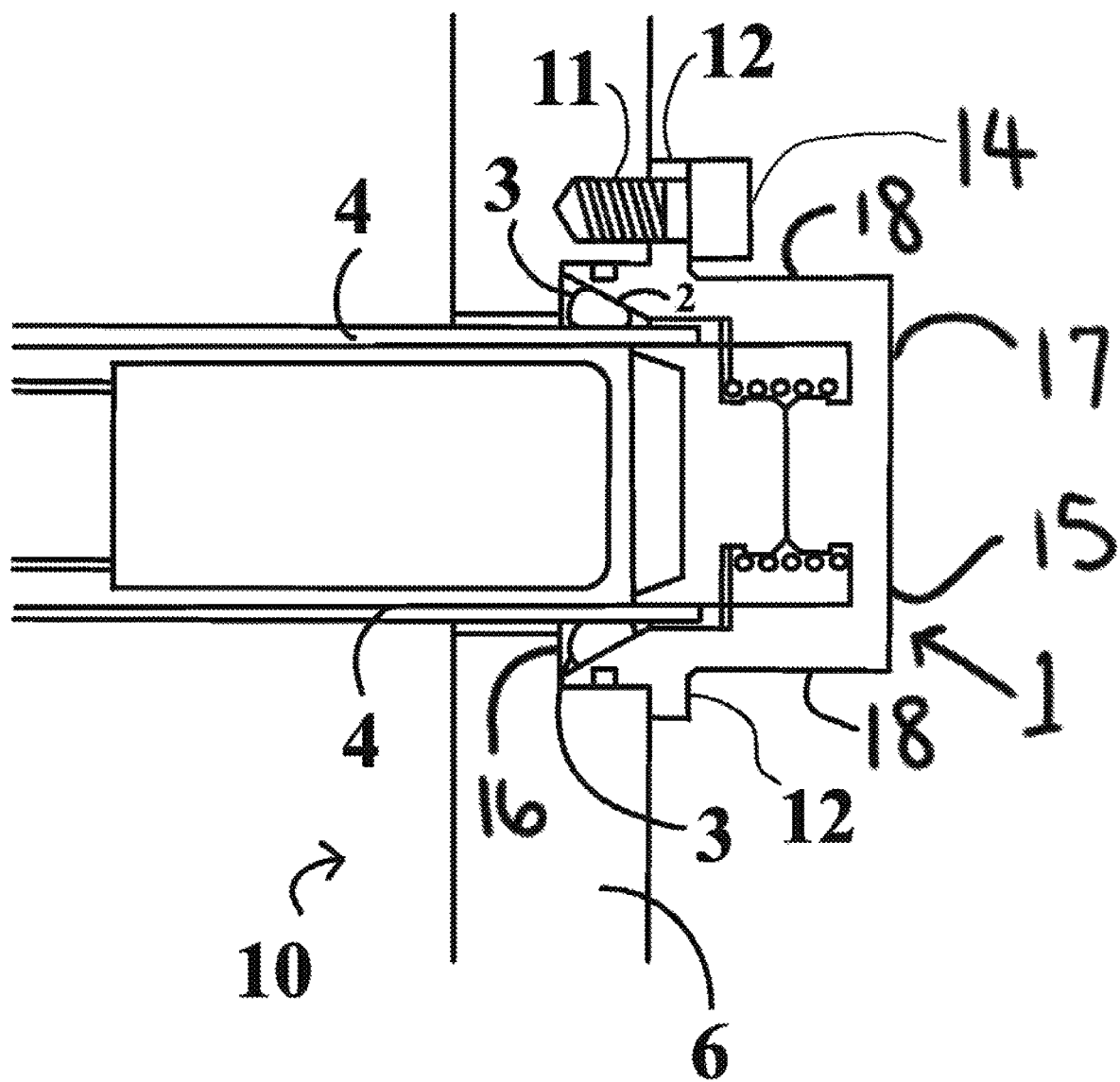
FIG. 1 depicts a side cutaway view showing the compressed seal in the in the wedge shaped seal face.
Figure 2:
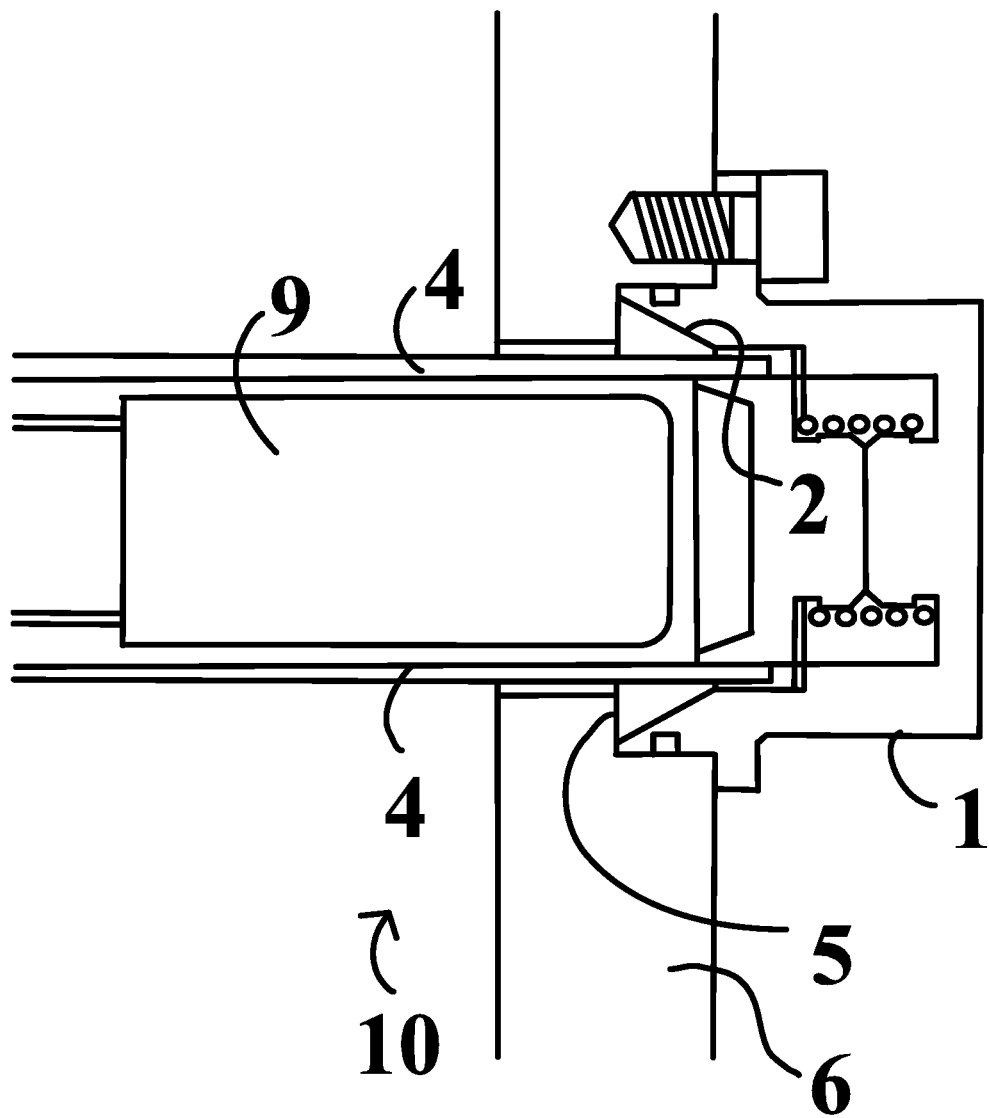
FIG. 2 depicts a side cutaway view of the wedge shaped seal face.
Figure 4A:
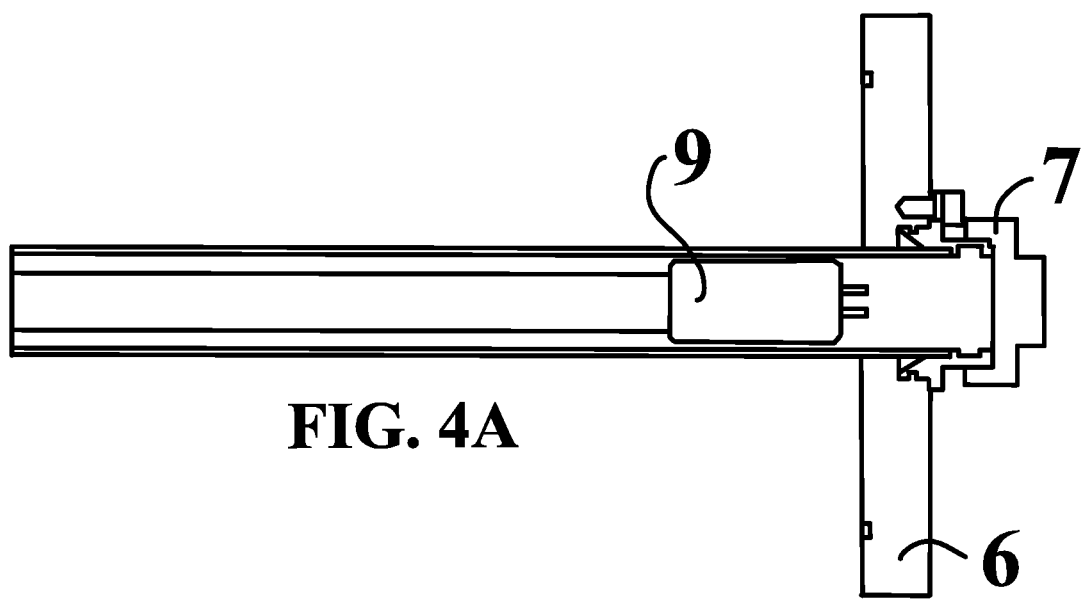
FIG. 4A depicts a side cutaway view of the wedge shaped seal face mounted to the reactor with quartz sleeve and lamp.
Figure 4B:
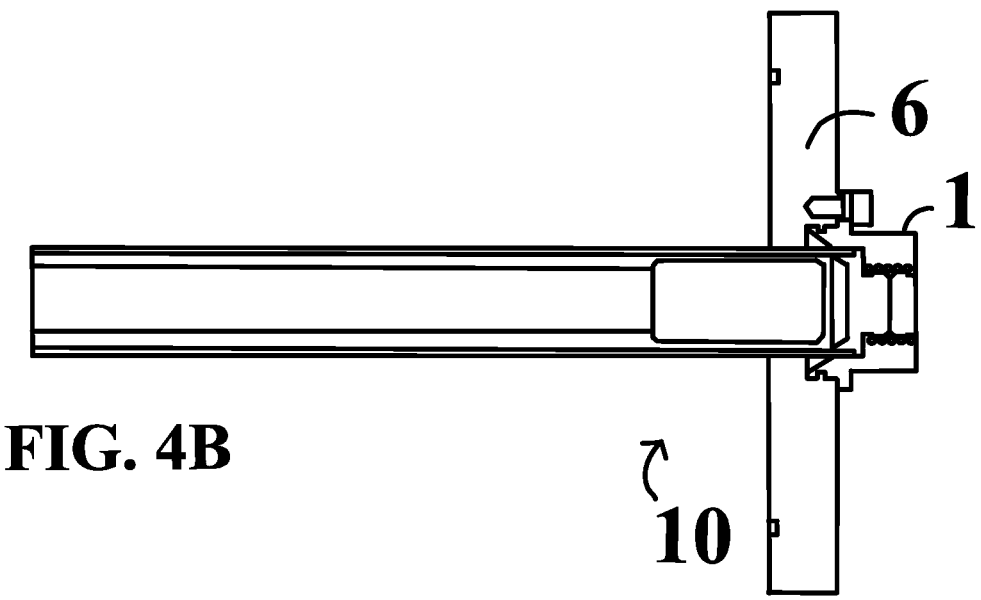
FIG. 4B depicts a side cutaway view of the wedge shaped seal face mounted to the reactor with quartz sleeve.

One embodiment (FIG. 1) of an improved clamp ring system comprises, clamp ring 1 having wedge shaped seal face 2, and flange 12 removably attached to flange mounting holes 11 of reactor 6; reactor 6 having clamp ring mounting recess 5, and flange mounting holes 11; quartz sleeve 4 disposed within clamp ring mounting recess 5, and seal 3 being disposed within clamp ring mounting recess 5 around quartz sleeve 4.

Clamp ring 1 is removably attached to reactor 6 approximate clamp ring mounting recess 5, such that wedge shaped seal face 2 compresses seal 3 against quartz sleeve 4. In one embodiment, seal 3 has a bulbous cross section relative to conventional seals.

Clamp rings 1 & 7, and reactor 6 are preferably made of stainless steel, but other materials can be used to accommodate the various needs (e.g. UV water treatment reactor). Seal 3 can be made of rubber or other materials suitable for providing water-tight seals. Quartz sleeve 4 serves as a housing for lamp 9 placed therein. For instance a UV (ultra violet) lamp within a UV reactor.

Figure 6:
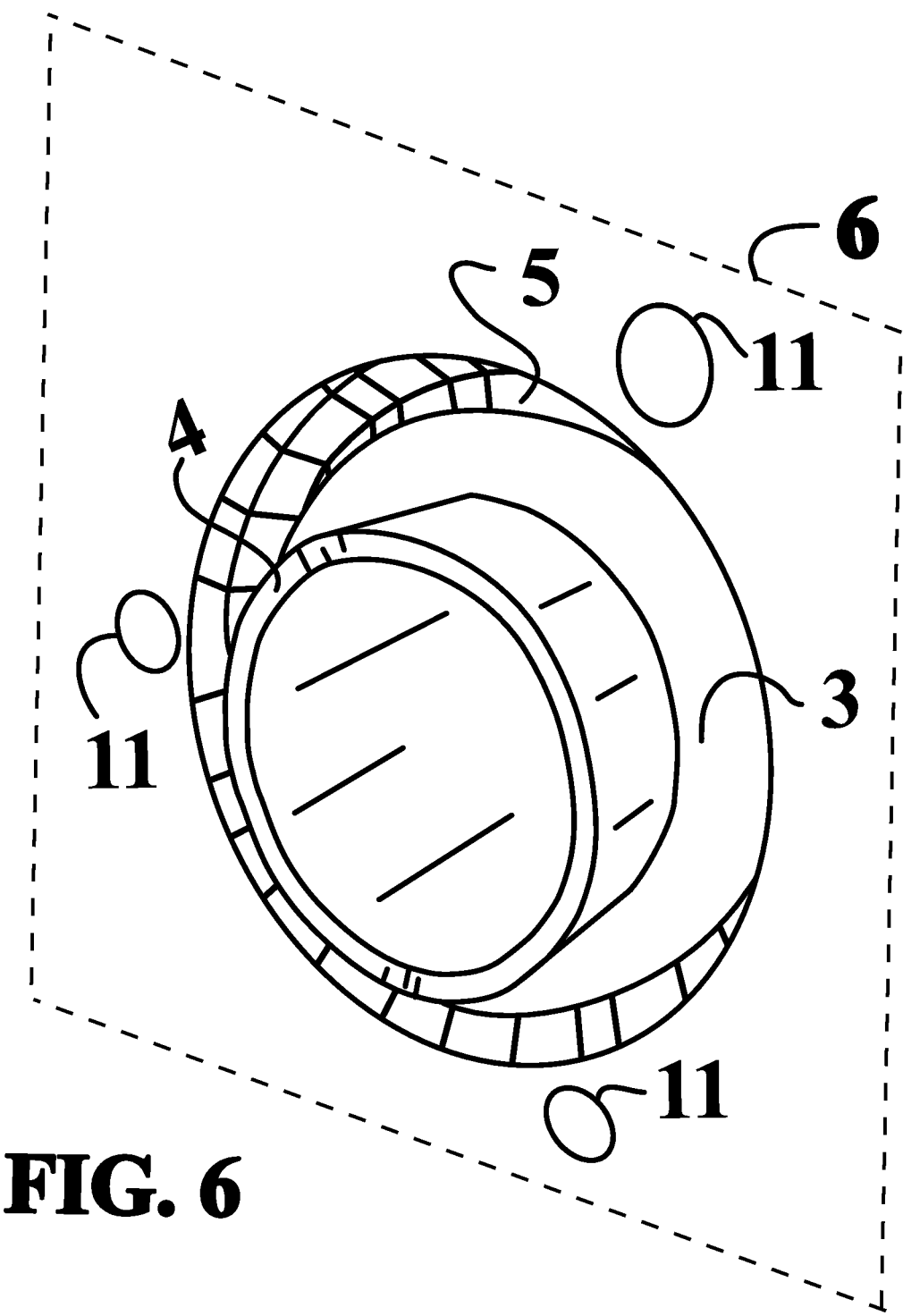
FIG. 6 depicts a perspective view of a seal around a quartz sleeve in a mounting recess.

Clamp ring flange 12 includes mounting holes 13 configured to receive a fastener 14 for removably attaching clamp ring 1 to reactor 6 via flange mounting holes 11 (FIG. 6) of reactor 6. Clamp ring 1 has first end 15 and second end 16 disposed opposite to the first end, and end wall 17 disposed at the first end, and wedge shaped seal face 2 disposed at the second end. Clamp ring 1 has peripheral sidewall 18 extending between the end wall and the clamp ring flange. Clamp ring flange 12 protrudes beyond peripheral sidewall 18 of the clamp ring (e.g. FIG. 1). A portion of wedge shaped seal face 2 is disposed radially outward relative to peripheral sidewall 18.

What is claimed is:

1. An improved clamp ring system comprising:
a clamp ring having a wedge shaped seal face disposed at an angle of 28.4 degrees, and removably attached to a reactor with a clamp ring flange.

2. The improved clamp ring system of claim 1 further comprising:
the clamp ring flange includes at least one mounting hole configured to receive a fastener for removably attaching the clamp ring to the reactor;
wherein the at least one mounting hole of the clamp ring flange comprises a plurality of mounting holes circumferentially spaced apart on the clamp ring flange, each of the plurality of mounting holes configured to receive a respective fastener for removably attaching the clamp ring to the reactor.

3. An improved clamp ring system comprising:
a clamp ring having a wedge shaped seal face disposed at an angle of 28.4 degrees, and removably attached to a wall of a reactor with a clamp ring flange, the wall of the reactor having an inner surface facing a reactor cavity and an outer surface disposed opposite to the inner surface, the clamp ring flange overlapping the outer surface of the wall of the reactor;
the wall of the reactor having a clamp ring mounting recess;
a quartz sleeve disposed within the clamp ring mounting recess;
a seal being disposed within the clamp ring mounting recess around the quartz sleeve;
wherein the clamp ring is removably attached to the reactor proximate the clamp ring mounting recess, such that the wedge shaped seal face compresses the seal against the quartz sleeve.

4. The improved clamp ring system of claim 3 further comprising:
the seal having a bulbous cross section.

5. The improved clamp ring system of claim 3, wherein the clamp ring mounting recess comprises a counterbore hole disposed in the wall of the reactor, the counterbore hole comprising an annular ledge; and wherein the seal is disposed in an annular cavity bounded by the annular ledge of the counterbore hole, a portion of the quartz sleeve, and the wedge shaped seal face.

6. The improved clamp ring system of claim 3, wherein the clamp ring flange includes at least one mounting hole configured to receive a fastener for removably attaching the clamp ring to the reactor.

7. The improved clamp ring system of claim 6, wherein the at least one mounting hole of the clamp ring flange comprises a plurality of mounting holes circumferentially spaced apart on the clamp ring flange, each of the plurality of mounting holes configured to receive a respective fastener for removably attaching the clamp ring to the reactor.

8. The improved clamp ring system of claim 7, wherein the wall of the reactor comprises a plurality of flange mounting holes corresponding to the plurality of mounting holes of the clamp ring flange.

9. An improved clamp ring system comprising:
a clamp ring having a first end and a second end disposed opposite to the first end, the clamp ring having an end wall disposed at the first end and a wedge shaped seal face disposed at the second end, the clamp ring further including a clamp ring flange removably attaching the clamp ring to a reactor, and the clamp ring additionally including a peripheral sidewall extending between the end wall and the clamp ring flange;
the wedge shaped seal face being disposed at an angle of 28.4 degrees;
wherein the clamp ring flange protrudes beyond the peripheral sidewall of the clamp ring.

10. The improved clamp ring system of claim 9, wherein the clamp ring flange includes at least one mounting hole configured to receive a fastener for removably attaching the clamp ring to the reactor.

11. The improved clamp ring system of claim 9, wherein a portion of the wedge shaped seal face is disposed radially outward relative to the peripheral sidewall of the clamp ring.

* * * * *